March 31, 1970 G. NEUMANN 3,503,478
HIGH AND LOW SPEED MOTORS CONNECTED BY TORQUE LIMITING CLUTCH
Filed May 27, 1968 2 Sheets-Sheet 1
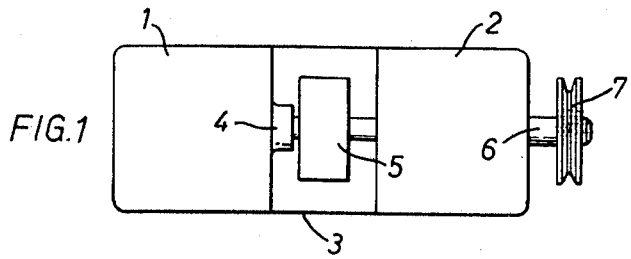
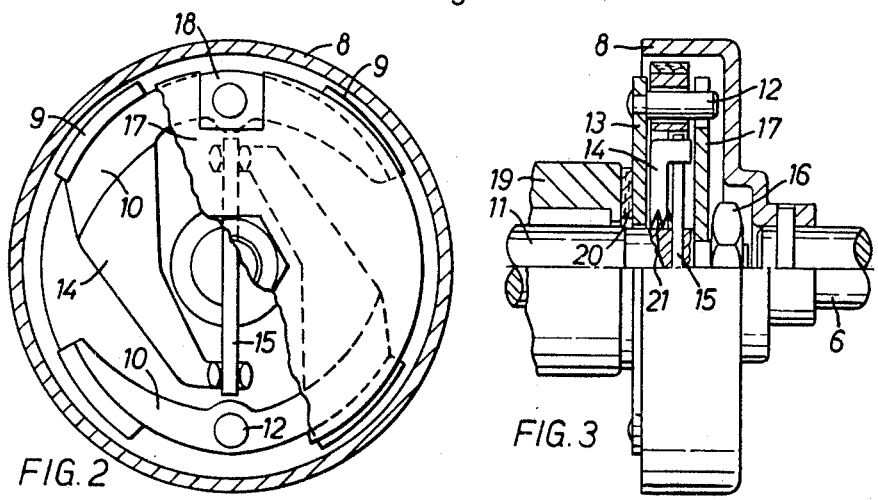
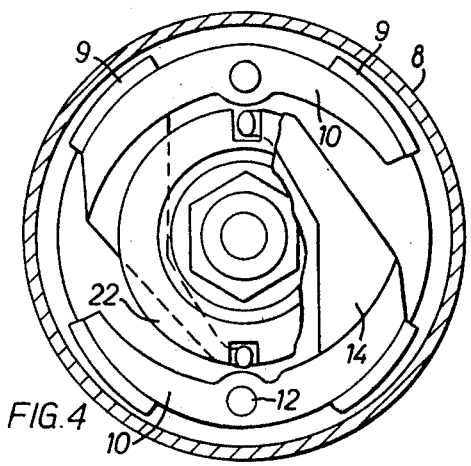
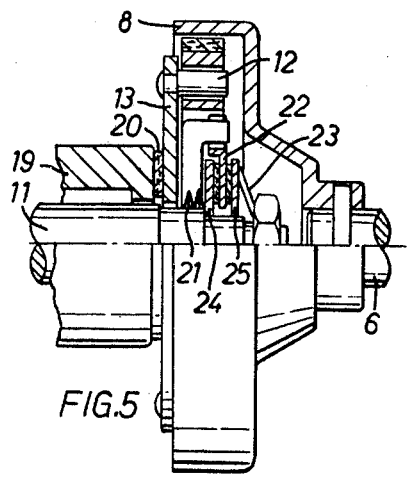
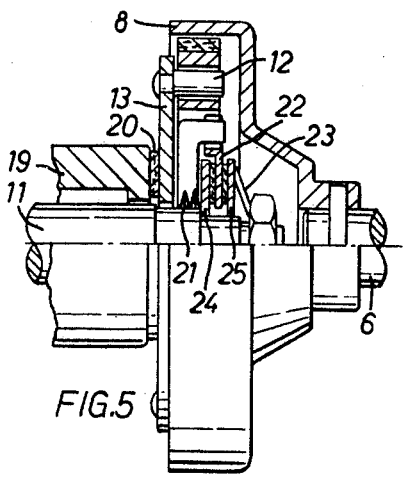
Inventor:
Gernot Neumann
By: Spencer & Kaye
Attorneys Inventor:
Gernot Neumann United States Patent Office 3,503,478
Patented Mar. 31, 1970

3,503,478
HIGH AND LOW SPEED MOTORS CONNECTED
BY TORQUE LIMITING CLUTCH
Gernot Neumann, Lipperreihe, near Bielefeld, Germany,
assignor to Hanning Elektro-Werke Robert Hanning,
Bielefeld, Germany, a German firm
Filed May 27, 1968, Ser. No. 732,312
Int. Cl. F16d 43/20, 13/20
U.S. Cl. 192—35                                      9 Claims

ABSTRACT OF THE DISCLOSURE

A multi-speed drive unit for a washing machine, in which two motors are linked by a torque limiting clutch. In order to avoid overloads on the clutch and associated gearing, the clutch includes linkage means between the clutch members and the motor to which they are connected which limit the engagement forces between the clutch members and its drum.

---

The invention relates to a multi-speed drive unit, and to a clutch therefor, for example for fully automatic drum type washing machines. A known drive unit has two electric motors which act on a common driven shaft, a reversible motor producing lower speeds being connected, in the operational state, through a clutch, to the shaft of a faster running motor from which, after the latter has been switched on, it is automatically disconnected by means of the clutch. Such double drives for automatic washing machines have the disadvantage that they often suffer from failure of the gearing or clutch in the event of faulty control. Such fault control might cause the motor for the washing operation to be switched on in one direction of rotation while the spin dryer is still running at full speed. Such fault operation cannot always be avoided in practice, particularly since such machines are arranged for both manual and automatic actuation.

In view of such disadvantages, it is the object of the invention to provide a drive unit the construction of which makes allowance for practical conditions since the connection which can be established between the two electric motors acting on a common driven shaft is resilient in construction.

In order to solve the problem posed, the invention proposes a multi-speed drive unit comprising a lower speed reversible motor, a shaft for said lower speed reversible motor, a higher speed motor, a shaft for said higher speed motor, a torque limiting clutch connecting said shaft of said lower speed reversible motor to said shaft of said higher speed motor and output means on said shaft of said higher speed motor, said torque limiting clutch including a clutch drum connected for rotation with said shaft of said higher speed motor, a plurality of clutch members operating within said drum, rocker arms carrying said clutch member in pairs, a carrier plate carrying said rocker arms and linkage means connecting said rocker arms with said shaft of said lower speed reversible motor such that said linkage means limits the engagament force of said clutch members so as to permit slipping between said clutch members and said drum when said engagement force reaches a predetermined value. In an advantageous development of the invention, the free ends of the rocker arms of the clutch jaws act on one or more springs connected to the shaft of the reversible motor, or the rocker arms of the clutch jaws may have an actuating arm which is in engagement with the shaft of the reversible motor and which is tapered in any desired manner and produced from resilient material. In either case, it is regarded as advantageous if pins extending parallel to the shaft of the reversible motor project from the carrier plate serving as a bearing for the rocker arms and project into corresponding recesses in a limiting plate which is bolted onto said shaft and which restricts the rotation of the carrier plate because of the dimensions of the recesses.

In another advantageous embodiment, one of the free ends of the rocker arms of the clutch jaws act articulately on a driving disc which rotatably surrounds the shaft of the reversible motor and which is mounted between counter discs mounted at each side thereof on the shaft of the reversible motor and subject to the contact pressure of spring members, and so represents a slipping clutch between the shaft of the reversible motor and the rocker arms of the clutch jaws. In this case, each of the faces of the driving disc and of its counter discs in contact with one another may may be provided with a brake lining.

In the above-mentioned embodiments of the subject of the invention it is advisable for the carrier plate for the rocker arms, which is initially loaded by means of cup springs, to bear against a friction lining on a stationary part of the drive unit, as a result of which a braking torque is produced which slightly exceeds the torque necessary for the movement of the clutch jaws. In addition, in order to obtain equal radial forces it would be advisable to allow the clutch jaws acting at the circumference of the clutch drum to be spaced 180° apart. Finally, in view of the fact that silent running is always required for drive units of the kind in question, it is advisable for the clutch jaws to be equipped with sound-damping and shock-absorbing coverings.

The technical progress achieved by the invention in comparison with the prior art lies in a drive unit of which the clutch members disposed between the washing motor and spin-drying motors has a clutch force which is dependent on the torque. In addition, this clutch is symmetrical in construction and so ensures functional characteristics in both directions of rotation thereof. Moreover, when the spin drying motor is switched on, the clutch acts as a torque limiting clutch and automatically releases the connection between the two motors so that the whole drive unit, and particularly its gearing, it protected from overloading in the event of faulty operation.

Examples of embodiments of the invention are described below with reference to the drawing in which:

FIGURE 1 shows a diagrammatic side view of a multi-speed drive unit according to the invention;

FIGURE 2 shows a section of the clutch in FIGURE 1;

FIGURE 3 shows a side view, half in section, of the clutch in FIGURE 2;

FIGURE 4 shows a section of another construction of the clutch in FIGURE 1;

FIGURE 5 shows a side view, half in section, of the clutch in FIGURE 4; and

Figure 6:
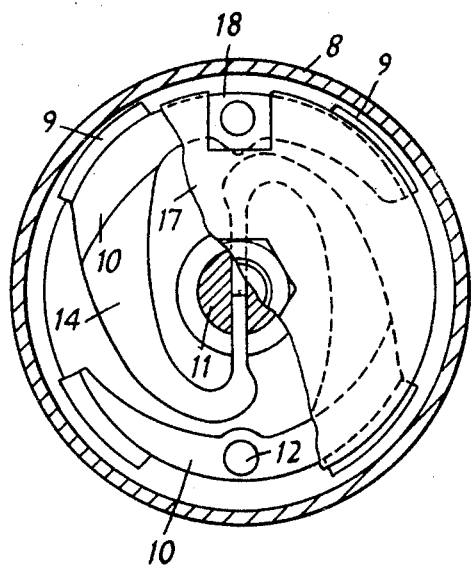
FIGURE 6 shows an axial section of a further construction of the clutch of FIGURE 1.

A drive unit illustrated in FIGURE 1 includes two electric motors 1 and 2 which are connected in series coaxially and are accommodated in a common housing 3. The electric motor 1 is reversible and serves to produce lower speeds, such as are necessary for the washing operation of fully automatic drum-type washing machines. The motor acts through a reduction gearing and a torque limiting clutch 5 on the shaft of the electric motor 2. This electric motor 2 is a very much faster running motor which produces the high speeds necessary for the spin-drying of the washing. Its shaft is the driven shaft 6 of the whole drive unit and is equipped with a belt pulley 7.

Drive units of the kind indicated above are subject to the risk that, as a result of faulty operation, the electric motor 1 producing the lower speeds may be switched on, in the opposite direction of rotation, while the washing drum is still running at high speed in spin-drying operation. In order to protect the gearing 4 from overloading in such cases, the torque limiting clutch 5 has special constructional features.

The torque limiting clutch 5 shown in FIGURES 2 and 3 has a bell-shaped clutch drum 8 which is secured to the driven shaft 6. Clutch members 9 bear against the inner circumference of the drums when the clutch is engaged. The clutch members 9, which are equipped with self-damping and shock-absorbing coverings, are secured in pairs to the free ends of rocker arms 10. The rocker arms 10 are in turn mounted symmetrically on a carrier plate 13 on pins 12 extending parallel to the shaft 11 of the reversible motor 1. At one of their free ends, the rocker arms 10 each have an actuating arm 14 which acts on a spring rod 15. This spring rod 15 is inserted in a bore in the shaft 11 and forms a flexible connecting member between the shaft 11 and the clutch members 9.

A limiting plate 17, which is secured by means of a threaded nut 16 to the shaft 11 of the reversible motor 1, has recesses 18 in the region of the pins 12 extending from the carrier plane 13, which recesses restrict the angle of rotation of the carrier plate 13 as a result of their dimensions. As will be described, the torque limiting clutch 5 provides the required torque limitation which prevents the contact pressure of the clutch members 9 against the clutch drum 8 exceeding a predetermined value.

In order to ensure reliable contact between the clutch members 9 and the clutch drum 8 when the reversible motor 1 is started, the carrier plate 13 must bear, in the position of rest, against a stationary part, here the housing 19 of the motor 1, so that a slight friction acts between them. This purpose is served by a friction lining 20 which produces a braking torque which slightly exceeds the torque necessary for the movement of the clutch members 9. The carrier plate 13 is initially loaded with two cup springs 21 for the same purpose.

The operation of the multi-speed drive unit will now be described:

(1) Low speed operation clockwise.—The low speed reversible motor 1 is energised in a clockwise direction and drives the shaft 11 through the reduction gearing 4. As the shaft 11 starts to turn, the drive is transmitted to the spring rod which causes the rocker arms to pivot about the pins 12 to engage the clutch members 9 adjacent the actuating arms 14 to engage the drum 8. The carrier plate 13 carrying the pins 12 is prevented from rotating with the shaft 11 by contact with the friction lining 20 and thus the clutch members engage the drum 8 with a force provided by the resilience of the spring rod 15. The carrier plate 13 will however follow the shaft 11 and its movement relative to the shaft 11 is limited by the recesses 18 in the limiting plate 17. In this way the engaging force of the clutch members 9 is limited. The engagement of the clutch members with the drum 8 causes the shaft 6 to rotate with the shaft 11.

(2) Low speed operation anticlockwise.—This operation is the same as for clockwise except that the clutch members 9 farthest from the actuating arms 14 engage the drum 8. It will be observed that the limiting plate will work equally with either direction of rotation, the pins 12 engaging the side of the recess 18 associated with the sense of rotation in operation.

(3) High speed operation clockwise.—The motor 2 is energised and will run clockwise (assuming this to be the sole sense of rotation of the motor 2). The shaft 6 will be rotated clockwise and will rotate the drum 8 in the same sense. No action of the motor 1 takes place and thus the clutch members 9 remain disengaged and no drive is transmitted to the shaft 11, reduction gear 4 or motor 1.

(4) High speed operation clockwise and low speed operation anticlockwise.—This situation can only occur as a result of faulty operation. In normal circumstances the motor 1 and the motor 2 can only be operated alternatively. In this case, the shaft 11 is turning slowly anticlockwise and the clutch members 9 farthest from the actuating arms 14 are in engagement with the drum. The drum 8 is however being rotated at high speed by the shaft 6. This rotation of the drum 8 is transmitted to the clutch members 9 and attempts to turn the shaft 11 clockwise. The effect of this is to increase the engaging force between the clutch members 9 and the drum 8. This force is however limited by the action of the limiting plate 17 which prevents excessive relative motion between the carrier plate 13 and the shaft 11 and prevents further buildup of the engaging force. Thus the clutch members 9 will slip on the surface of the drum 8 and damage to the reduction gear 4 and the motor 1 is prevented.

(5) High speed operation clockwise and low speed operation clockwise.—This situation is also due to faulty operation. The action is the same as for (4) above, but in this case the clutch members 9 adjacent the actuating arms 14 are in engagement with the drum 8.

The clutch 5 shown in FIGURES 4 and 5 has a similar construction to that illustrated in FIGURES 2 and 3. Here, too, a bell-shaped clutch drum 8 is secured to the driven shaft 6 which is also the shaft of the high-speed motor 2, and clutch members 9, mounted in pairs on rocker arms 10, again come into engagement with the inner circumference of the clutch drum in order to produce a coupling action. The rocker arms 10 are likewise mounted symmetrically on pins 12 which extend from a carrier plate 13 parallel to the shaft 11 of the reversible motor 1. The carrier plate 13 bears against the housing 19 through the friction lining 20 in order to produce a starting friction and is likewise subject to slight action by cup springs 21.

As distinct from the example shown in FIGURES 2 and 3, the actuating arms 14 at the free ends of the rocker arms 10 act on a driving disc 22 rotatably surrounding the shaft 11. This driving disc 22 is mounted between counter discs 24 and 25 mounts at each side thereof on the shaft 11 and subject to the contact pressure of a cup spring 23. Thus there is a slipping clutch between the shaft 11 of the reversible motor and the rocker arms 10 of the clutch members 9 as a result of which the transmissible torque is limited in the required manner.

It will therefore be seen that the slipping clutch takes over the function of the limiting plate 17 of FIGURES 2 and 3. However, in this case the actuating arms 14 are allowed to follow the carrier plate 13 when excessive force is generated between the clutch members 9 and the drum 8 instead of the carrier plate 13 being caused to follow the shaft 11. Otherwise the operation of the embodiment of FIGURES 4 and 5 is the same as that of FIGURES 2 and 3.

FIGURE 6 shows an embodiment of the invention in which the arrangement as shown in FIGURE 2 is modified. In this embodiment, each rocker arm 10 of the clutch members 9 has an actuating arm 14 which is in engagement with the shaft 11 of the reversible motor 1. The actuating arm is tapered as shown, is produced from a resilient material, and forms the linkage which in FIGURE 2 comprises the rod 15.

What I claim as new and desire to secure by Letters Patent of the United States is:

1. A multi-speed drive unit comprising a lower speed reversible motor, a shaft for said lower speed reversible motor, a higher speed motor, a shaft for said higher speed motor, a torque limiting clutch connecting said shaft of said lower speed reversible motor to said shaft of said higher speed motor and output means on said shaft of said higher speed motor, said torque limiting clutch including a clutch drum connected for rotation with said shaft of said higher speed motor, a plurality of clutch members operating within said drum, rocker arms carrying said clutch members in pairs, a carrier plate carrying said rocker arms and linkage means connecting said rocker arms with said shaft of said lower speed reversible motor such that said linkage means limits the engagement force of said clutch members so as to permit slipping between said clutch members and said drum when said engagement force reaches a predetermined value.

2. A drive unit as claimed in claim 1, wherein said linkage means comprises one or more springs connected to the shaft of the reversible motor and on which a free end of each of said rocker arms act.

3. A drive unit as claimed in claim 1, wherein said linkage means comprises an actuating arm for each of said rocker arms, said actuating arm being in engagement with the shaft of the reversible motor, being tapered and being produced from a resilient material.

4. A drive unit as claimed in claim 2, further comprising pins, projecting parallel to said shaft of said lower speed reversible motor from said carrier plate into corresponding recesses in a limiting disc which is bolted to said shaft of said lower speed reversible motor, the said limiting disc, as a result of the dimensions of the recesses, permitting only a small angle of relative rotation between said carrier plate and said shaft of said lower speed reversible motor.

5. A drive unit as claimed in claim 1 wherein said linkage means comprises a driving disc to which one free end of each of said rocker arms is articulated and which rotatably surrounds the shaft of the reversible motor, counter discs mounted at each side of said driving disc on said shaft of said lower speed reversible motor and spring members acting to provide contact pressure between said driving disc and said counter discs, said driving disc and said counter discs forming a slipping clutch between said shaft of said lower speed reversible motor and said rocker arms.

6. A drive unit as claimed in claim 5, further comprising clutch linings on each face of said driving disc and the face of each of said counter discs in contact with said driving disc.

7. A drive unit as claimed in claim 1, further comprising cup springs for initially loading said carrier plate and a friction lining on a stationary part of the drive unit against which said carrier plate bears, as a result of which a braking torque is produced which slightly exceeds the torque necessary for the movement of said clutch members.

8. A drive unit as claimed in claim 1, wherein said clutch members acting at the circumference of the clutch drum are offset by 180° in order to obtain uniform radial forces.

9. A drive unit as claimed in claim 1, wherein said clutch members are equipped with sound-damping and shock-absorbing linings.

References Cited

UNITED STATES PATENTS

| | | | |
|---|---|---|---|
| 614,699 | 11/1898 | Clarke | 192—35 |
| 1,231,341 | 6/1917 | Dufour | 192—55 |
| 2,970,680 | 2/1961 | Cain | 192—41 XR |
| 3,019,669 | 2/1962 | Cozzo et al. | 192—.02 XR |
| 3,319,751 | 5/1967 | Sacchini | 192—48.92 X |

BENJAMIN W. WYCHE, III, Primary Examiner

U.S. Cl. X.R.

64—30; 191—.02, .098, 48.3, 55, 56, 75